(12) United States Patent
Martin et al.

(10) Patent No.: US 9,467,002 B2
(45) Date of Patent: Oct. 11, 2016

(54) VEHICLE CHARGING SYSTEM

(75) Inventors: Douglas Raymond Martin, Canton, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 13/553,513

(22) Filed: Jul. 19, 2012

(65) Prior Publication Data

US 2014/0021914 A1    Jan. 23, 2014

(51) Int. Cl.
*H02J 7/00* (2006.01)
*H02J 7/02* (2016.01)
(Continued)

(52) U.S. Cl.
CPC .............. *H02J 7/025* (2013.01); *B60L 3/0023* (2013.01); *B60L 3/0046* (2013.01); *B60L 3/04* (2013.01); *B60L 11/14* (2013.01); *B60L 11/182* (2013.01); *B60L 11/1805* (2013.01); *B60L 11/1824* (2013.01); *B60L 11/1829* (2013.01); *B60L 11/1833* (2013.01); *B60L 11/1861* (2013.01); *B60L 11/1874* (2013.01); *B60L 11/1875* (2013.01); *H01M 10/443* (2013.01); *H02H 5/045* (2013.01); *H02J 7/0004* (2013.01); *B60L 2210/30* (2013.01); *B60L 2240/36* (2013.01); *B60L 2240/545* (2013.01); *B60L 2240/547* (2013.01); *B60L 2240/549* (2013.01); *B60L 2250/16* (2013.01); *H01M 2220/20* (2013.01); *Y02T 10/70* (2013.01); *Y02T 10/705* (2013.01);
(Continued)

(58) Field of Classification Search
CPC ................. H02J 7/04; H02J 7/16; H02J 7/00

USPC ........................... 320/109, 150, 104; 315/86
See application file for complete search history.

(56) References Cited

U.S. PATENT DOCUMENTS 5,523,666 A    6/1996 Hoelzl et al.
5,617,003 A *  4/1997 Odachi et al. ................ 320/108
(Continued)

FOREIGN PATENT DOCUMENTS

CN    201051675 Y    4/2008
CN    101615809 A    12/2009
(Continued)

OTHER PUBLICATIONS

Office Action from U.S. Appl. No. 13/553,442, dated Nov. 18, 2014, 16 pages.
(Continued)

*Primary Examiner* — Richard Isla Rodas
*Assistant Examiner* — Dung V Bui
(74) *Attorney, Agent, or Firm* — David B. Kelley; Brooks Kushman P.C.

(57) ABSTRACT

A vehicle is provided comprising a battery, a charge plate electrically connected to the battery, and a thermal sensor configured to output a signal indicative of a sensed temperature. The thermal sensor can be positioned to determine temperature in the area proximate to the charge plate. The vehicle further includes at least one controller configured to (a) cause an association signal to be repeatedly transmitted during a battery charge procedure such that charging of the battery via the charge plate is maintained, and (b) in response to the sensed temperature exceeding a primary threshold, cause the repeated transmission of the association signal to be interrupted such that charging of the battery ceases.

16 Claims, 3 Drawing Sheets

(51) Int. Cl.
  *B60L 11/18* (2006.01)
  *H01M 10/44* (2006.01)
  *H02H 5/04* (2006.01)
  *B60L 3/00* (2006.01)
  *B60L 3/04* (2006.01)
  *B60L 11/14* (2006.01)

(52) U.S. Cl.
  CPC ......... *Y02T 10/7005* (2013.01); *Y02T 10/7044* (2013.01); *Y02T 10/7072* (2013.01); *Y02T 10/7077* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 5,850,135 A | 12/1998 | Kuki et al. | |
| 6,489,751 B2 * | 12/2002 | Small et al. | 320/150 |
| 6,710,546 B2 * | 3/2004 | Crenshaw | 315/86 |
| 8,253,387 B2 * | 8/2012 | Newhouse et al. | 320/150 |
| 8,872,476 B2 | 10/2014 | Huang et al. | |
| 8,946,938 B2 * | 2/2015 | Kesler et al. | 307/104 |
| 2007/0131505 A1 | 6/2007 | Kim | |
| 2008/0030171 A1 * | 2/2008 | Villefrance et al. | 320/150 |
| 2009/0001932 A1 | 1/2009 | Kamijo et al. | |
| 2009/0085522 A1 | 4/2009 | Matsumoto | |
| 2010/0013320 A1 | 1/2010 | Shiozaki et al. | |
| 2010/0109604 A1 * | 5/2010 | Boys et al. | 320/109 |
| 2010/0156346 A1 | 6/2010 | Takada et al. | |
| 2010/0237709 A1 | 9/2010 | Hall et al. | |
| 2010/0253153 A1 | 10/2010 | Kondo et al. | |
| 2011/0022222 A1 | 1/2011 | Tonegawa | |
| 2011/0057612 A1 | 3/2011 | Taguchi et al. | |
| 2011/0074346 A1 | 3/2011 | Hall et al. | |
| 2011/0178654 A1 | 7/2011 | Bauerle et al. | |
| 2011/0181240 A1 | 7/2011 | Baarman et al. | |
| 2011/0191186 A1 | 8/2011 | Levy et al. | |
| 2011/0193520 A1 | 8/2011 | Yamazaki et al. | |
| 2011/0221387 A1 * | 9/2011 | Steigerwald et al. | 320/108 |
| 2012/0038317 A1 | 2/2012 | Miyamoto et al. | |
| 2012/0056583 A1 | 3/2012 | Gotz | |
| 2012/0153894 A1 * | 6/2012 | Widmer | 320/108 |
| 2012/0161696 A1 * | 6/2012 | Cook et al. | 320/108 |
| 2012/0161702 A1 | 6/2012 | Kim | |
| 2012/0187757 A1 | 7/2012 | Wechlin et al. | |
| 2012/0200151 A1 | 8/2012 | Obayashi et al. | |
| 2013/0015812 A1 | 1/2013 | Boyer et al. | |
| 2013/0141034 A1 | 6/2013 | Huang et al. | |
| 2014/0021912 A1 | 1/2014 | Martin et al. | |
| 2014/0021913 A1 | 1/2014 | Martin et al. | |
| 2014/0021914 A1 * | 1/2014 | Martin et al. | 320/109 |

FOREIGN PATENT DOCUMENTS

| | | |
|---|---|---|
| CN | 102149566 | 8/2011 |
| CN | 102165669 | 8/2011 |
| CN | 102427260 | 4/2012 |
| WO | 2005109597 A1 | 11/2005 |
| WO | 2009081115 A1 | 7/2009 |
| WO | 2011006876 A2 | 1/2011 |

OTHER PUBLICATIONS

Office Action from U.S. Appl. No. 13/553,442, dated Mar. 13, 2015, 13 pages.

Office Action from U.S. Appl. No. 13/553,465, dated Dec. 24, 2014, 12 pages.

Chinese Office Action for Chinese Application No. 201310298131.8 dated Jun. 3, 2016.

\* cited by examiner

VEHICLE CHARGING SYSTEM

TECHNICAL FIELD

This disclosure relates to the recharging of vehicle batteries.

BACKGROUND

Charging methods for battery electric vehicles (BEV's) and plug in hybrid electric vehicles (PHEV's) have increased in prevalence as advancements in vehicle propulsion and battery technology have occurred.

SUMMARY

In at least one embodiment, a vehicle is provided comprising a battery, a charge plate electrically connected to the battery, and a thermal sensor configured to output a signal indicative of a sensed temperature. The thermal sensor can be positioned to determine temperature in the area proximate to the charge plate. The vehicle further includes at least one controller configured to (a) cause an association signal to be repeatedly transmitted during a battery charge procedure such that charging of the battery via the charge plate is maintained, and (b) in response to the sensed temperature exceeding a primary threshold, cause the repeated transmission of the association signal to be interrupted such that charging of the battery ceases.

In at least one embodiment, a vehicle is provided comprising a battery, a charge plate in electrical communication with the battery, and a sensor configured to output a signal indicative of a temperature in a vicinity of the charge plate. The vehicle further includes at least one controller configured to cause (a) an association signal to be repeatedly transmitted to a charge system during a charging of the battery via the charge plate such that charging of the battery is maintained, and (b) in response to the temperature exceeding a primary threshold, the repeated transmission of the association signal to be suspended such that charging of the battery discontinues.

In at least one embodiment, a method is provided which comprises outputting a temperature signal indicative of a temperature proximate to a charge plate, repeatedly transmitting an association signal to a charge system during charging of a battery via the charge plate such that the charge system maintains the charging of the battery, and interrupting the repeated transmission of the association signal in response to the temperature exceeding a primary threshold such that the charge system discontinues the charging of the battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may be powered by battery electricity (BEVs) as well as by a combination of power sources including battery electricity. For example hybrid electric vehicles (HEVs) are contemplated in which the powertrain is powered by both a battery and an internal combustion engine. In these configurations, the battery is rechargeable and a vehicle charger provides power to restore the battery after discharge.

Figure 1:
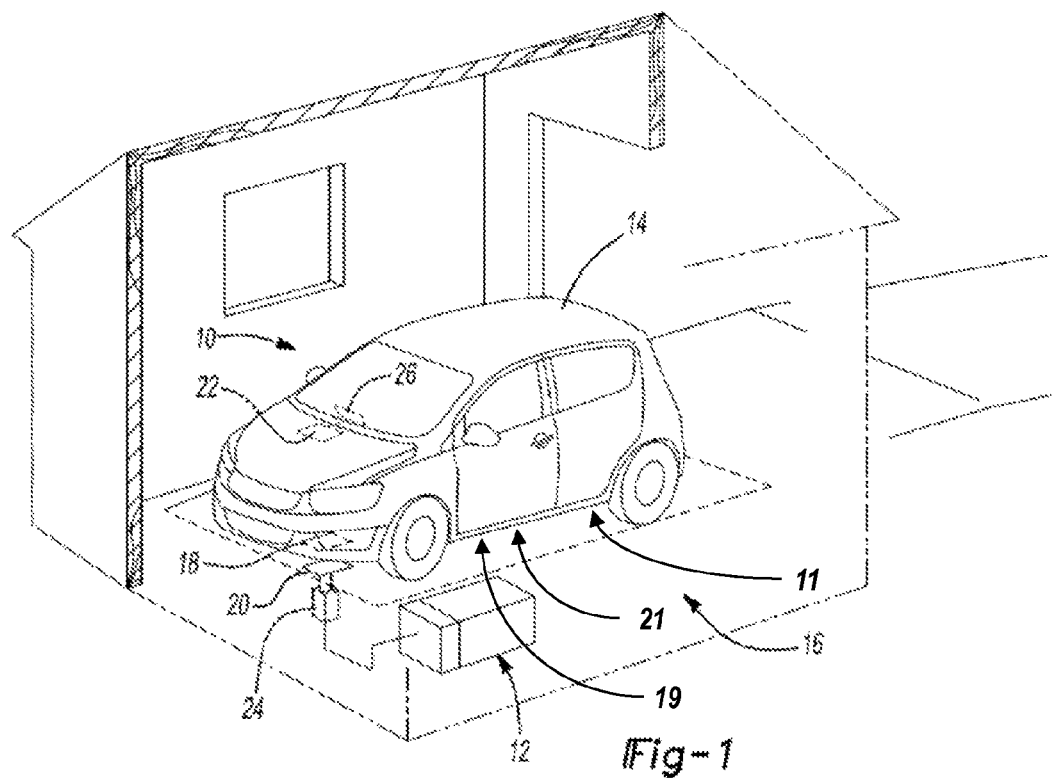
FIG. 1 is a diagrammatic view of a vehicle docked at a charging station.

With reference to FIG. 1, a vehicle charge system is illustrated in accordance with one or more embodiments and is generally referenced by numeral 10. Induction charging is used to provide power from a vehicle charger 12 to a vehicle 14 in order to restore the battery 11. A charging station 16 is shown accommodating the vehicle 14 to be charged through induction charging. The vehicle 14 docks at the charging station 16 which houses the vehicle charger 12. The vehicle charger 12 can be connected to receive household electrical current, such as that available within a typical home garage.

The vehicle 14 includes a secondary coil housed within an induction charge plate 18 disposed on the underside of the vehicle 14. The vehicle secondary induction charge plate 18 is electrically connected to the vehicle battery 11. The vehicle 14 also includes an AC to DC power converter in order to rectify and filter the AC power received from the vehicle charger 12 into DC power to be received by the battery 11. The vehicle charger 12 is disposed in the floor beneath the vehicle 14, and includes a primary charging coil housed within a corresponding primary induction charging plate 20. The primary induction charging plate 20 is generally horizontal and positioned at a distance from the vehicle secondary induction charge plate 18. The primary induction charging plate 20 can be articulable in height to create a suitable gap to facilitate charging of the vehicle 14. Electrical current is provided to the primary coil, which generates an electromagnetic field around the primary induction charging plate 20. When the vehicle secondary induction charge plate 18 is in proximate relation to the powered primary induction charging plate 20, it receives power by being within the generated electromagnetic field. Current is induced in the secondary coil and subsequently transferred to the vehicle battery, causing a recharging effect. The gap between the plates allows for variation in vehicle alignment, and also for accommodation of alternate authorized vehicles with differing ride heights.

In an alternative embodiment (not shown), the charging station primary induction charging plate is configured to be in a generally vertical position, for example on or near an upright wall. The vehicle would have a corresponding secondary induction charge plate on a front or rear vertical portion, for example as part of a front or rear bumper. The primary and secondary primary induction charging plates come in to a proximate relation when the vehicle is driven to the charge station, and parked in a designated charging position. Partly related to variation of the park position of the vehicle, an intentional gap would again be provided between the primary and secondary induction charge plates.

Referring back to FIG. 1, the vehicle 14 is provided with a controller 22. Although it is shown as a single controller, the vehicle controller 22 can include multiple controllers that are used to control multiple vehicle systems. For example, the vehicle controller 22 can be a vehicle system controller/powertrain control module (VSC/PCM). In this regard, the vehicle charging control portion of the VSC/PCM can be software embedded within the VSC/PCM, or it can be a separate hardware device. The vehicle controller 22 generally includes any number of microprocessors, ASICs, ICs, memory (e.g., FLASH, ROM, RAM, EPROM and/or EEPROM) and software code to co-act with one another to perform a series of operations. A microprocessor within the vehicle controller 22 further includes a timer to track elapsed time intervals between a time reference and selected events. Designated intervals are programmed such that the controller provides certain commands signals and monitors given inputs at selectable time intervals. The vehicle controller is in electrical communication with the vehicle battery, and receives signals that indicate the battery charge level. The vehicle controller 22 further communicates with other controllers over a hardline vehicle connection using a common bus protocol (e.g., CAN), and also employs wireless communication.

The vehicle charger 12 is provided with a charger controller 24 having wireless communication means. The charger controller 24 similarly has embedded software and is programmable to regulate power flow provided by the vehicle charger 12. Software included with the charger controller 24 also includes a timer to track elapsed time between designated events. Under selected conditions, or upon the receipt of designated instructions, the charger controller 24 can enable, disable, or reduce power flow through the charger 12. The vehicle charger 12 is configured to receive signals indicative of charge instructions from the vehicle controller 22.

The vehicle controller 22 is configured to wirelessly communicate with the charger controller 24. The wireless communication can be accomplished through RFID, NFC, Bluetooth, or other wireless methods. In at least one embodiment, said wireless communication is used to complete an association procedure between the vehicle 14, and the vehicle charger 12 prior to initiating a charge procedure. The association procedure can include the vehicle controller 22 sending a signal to the charger controller 24 indicating a request for authentication. The controller 22 then receives a response signal from the charger controller 24, and uses the response signal to determine whether or not to grant an initial authenticated status to the vehicle charger 12. Authentication can be influenced by a number of designated factors including manufacturer, power ratings, security keys, and/or other authentication factors. Based on an appropriate response signal by the charger controller 24, the vehicle controller 22 determines an affirmative association between the vehicle 14 and the vehicle charger 12. Once an authenticated charger is detected, the vehicle controller 22 provides an initiation signal to the charger controller 24 to instruct the charge system to initiate a charge procedure. The initial wireless request and subsequent authentication response make up an association "handshake" between the two devices. The association also provides for further secure communication and command signals between the vehicle 14 and the vehicle charger 12. If no affirmative authentication response is received by the vehicle controller 22, a command signal may be provided to prevent charging.

As mentioned above in reference to FIG. 1, there exists a gap between the vehicle secondary induction charge plate 18 and the primary induction charging plate 20. Related to this gap, there exists an opportunity for foreign objects to be present within the electromagnetic field of charge. Some objects may begin to accrue heat when exposed to the charge field. For example metal objects are capable of having eddy currents induced therein, and subsequently accumulating a high degree of heat. These objects may reach a critical temperature, causing damage to the object or a thermal event if in contact with other foreign material. Additionally, an overheated object left near the charge plate after the departure of the vehicle may pose a hazard to humans and animals. Charge management methods are disclosed herein that include sensing the temperature in a region proximate to the field of charge, and a subsequent response. At least one thermal sensor 19 is disposed on the vehicle 14 or the charging station 16. A detection zone is created that encompasses an area around the pair of induction charging plates. A number of sensors used in combination may provide a more comprehensive sensing zone. Also, various sensor types are suitable for this application. In at least one embodiment, infrared thermometer sensors are disposed on the vehicle 14 to monitor temperature in the vicinity of the electromagnetic charge field.

The charge system 10 is configured to manage the charge procedure such that a temperature excursion within the field of charge is both detected and mitigated before the temperature reaches a critical temperature. The vehicle controller 22 is configured to receive output signals from the thermal sensors, and use these data to enhance instructions provided to the vehicle charger 12. The thermal sensors are active prior to charge initiation, as well as during charge procedures. A signal is output indicative of the temperature sensed in the vicinity of the charge plate 18. If the sensed temperature exceeds a critical temperature corresponding to a primary threshold, the vehicle controller 22 is configured to cause the charger controller 24 to disable the vehicle charger 12 from continuing to provide power to the primary induction charge plate 20.

The vehicle controller 22 is also configured to cause a reduction in the charging current provided by the vehicle charger 12. A reduction in the charge current provided by the charging source reduces the amount of energy input into the body within the charge field. In this way, recharging of the battery 11 may still proceed if some heating is detected, albeit at a lesser rate. The vehicle controller 22 is configured to cause the transmission of a reduction signal to the vehicle charger 12 in response to the sensed temperature being between the primary and secondary thresholds. The vehicle charger 12 is prompted by the reduction signal to provide charging current at a reduced amperage level. By implementing a reduced charging current in response to the detection of a certain degree of heating, the default maximum charging current may be set to a higher level than it would be for a system that did not monitor the temperature.

The vehicle charger 12 is configured to require a repeated transmission of a signal from the vehicle 14 to preserve an affirmative association and maintain an ongoing charge procedure. The vehicle controller 22 can cause the association signal to be transmitted intermittently, or transmitted continuously. In at least one embodiment, the repeated transmission of the association signal occurs at predetermined time intervals. The initiation and/or conclusion of the association signal can also be triggered by charging related events, for example such as designated threshold battery charge levels, or predetermined cumulative energy thresholds delivered by the vehicle charger. The charger controller 24 is programmable to disable the primary induction charging plate 20 if no signal is received from the vehicle within designated time intervals. It is suitable to utilize the requirement of ongoing association signals as a means to disable charging when the sensed temperature in the area proximate to the charge plate rises above a predetermined value. In at least one embodiment, the vehicle controller 22 is configured to interrupt the repeated transmission of association signals to the vehicle charger 12 in response to the sensed temperature reaching a predetermined primary threshold. Interruption of the association signal causes the power supply to the primary induction charge plate 20 to be terminated. Current provided to the battery via the charge plate 18 is thereby reduced to zero. A redundant termination signal can be additionally provided to disable the vehicle charger 12.

Figure 2:
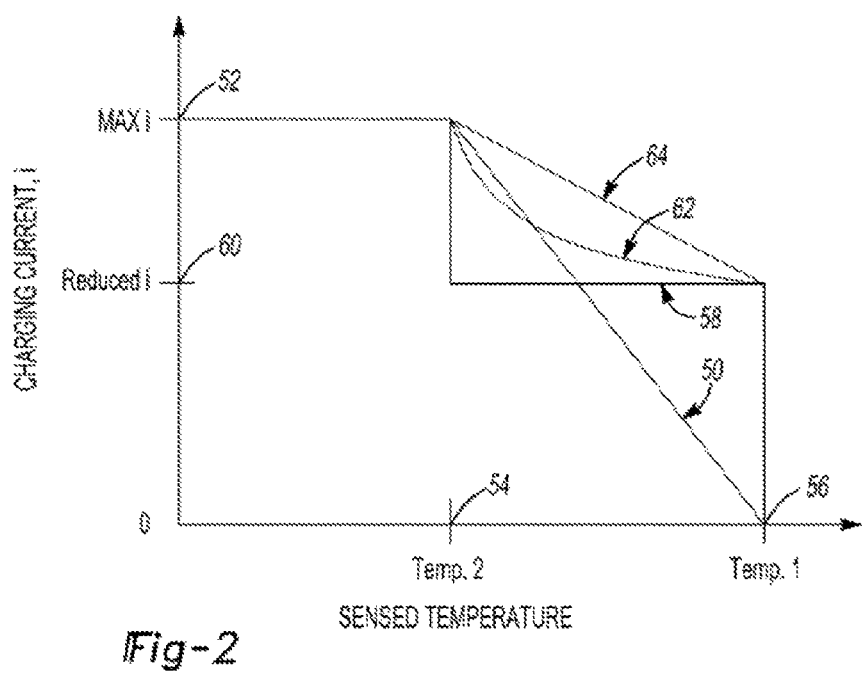
FIG. 2 is a flow chart of an algorithm for performing an ongoing wireless association between a vehicle and a vehicle charger.

FIG. 2 illustrates a plot of charging current versus sensed temperature in the area proximate to the induction charge plates. Several possible alternatives are depicted whereby charging current is reduced as a function of the sensed temperature value. Curve 50 represents a strategy whereby the charging current is reduced linearly from the maximum charge current 52 once the sensed temperature exceeds the secondary threshold 54. The charging current reduces to zero if the sensed temperature rises beyond the critical temperature, referred to herein as the primary threshold 56. According to another strategy represented by curve 58, the charging current is stepped down from the maximum charge current 52, to a predetermined reduced charge current 60 when the sensed temperature exceeds the secondary threshold 54. Curve 58 further shows a second step down to zero charging current when the sensed temperature exceeds the primary threshold 56. Curve 62 represents an additional strategy utilizing engineered function relating charging current and sensed temperature. It may be advantageous to decrease charging current more rapidly upon the sensed temperature initially exceeding the secondary threshold 54, in order to stem a temperature excursion more quickly. Finally, curve 64 represents a strategy whereby the charging current is reduced linearly from the maximum charge current 52 to a reduced charge current 60 as the sensed temperature rises from the secondary threshold 54 up to the primary threshold 56. The charging current is further reduced to zero if the sensed temperature exceeds the primary threshold 56. Under each strategy, the charging is shut off and zero current is provided when the sensed temperature exceeds the critical temperature, the primary threshold 56.

In alternative embodiments, the vehicle controller may be configured to control a vehicle switch to open a circuit connected to the secondary coil, so as to disable further current flow into the vehicle.

Referring back to FIG. 1, the vehicle controller 22 is further configured to cause the generation of a plurality of alert signals. The vehicle 14 is provided with a user display 26 inside the passenger compartment. The user display 26 serves as an alert mechanism to an operator. The controller 22 can cause the generation of a number of different in-vehicle display messages. For example, display alerts are generated that notify an operator of the temperature exceeding a threshold and/or the disablement of a charge procedure. The vehicle horn is an additional alert mechanism capable of providing an external audible alert signal in response to the detection of a high temperature near the field of charge. The horn alert pulse duration and repetition pattern may be set to be unique to distinguish a thermal excursion event from other events which cause horn pulses. The alerts may be configured to be generated when the temperature exceeds the secondary threshold prompting a reduced current charge procedure, or when the temperature exceeds the primary threshold prompting disablement of a charge procedure.

Figure 3:
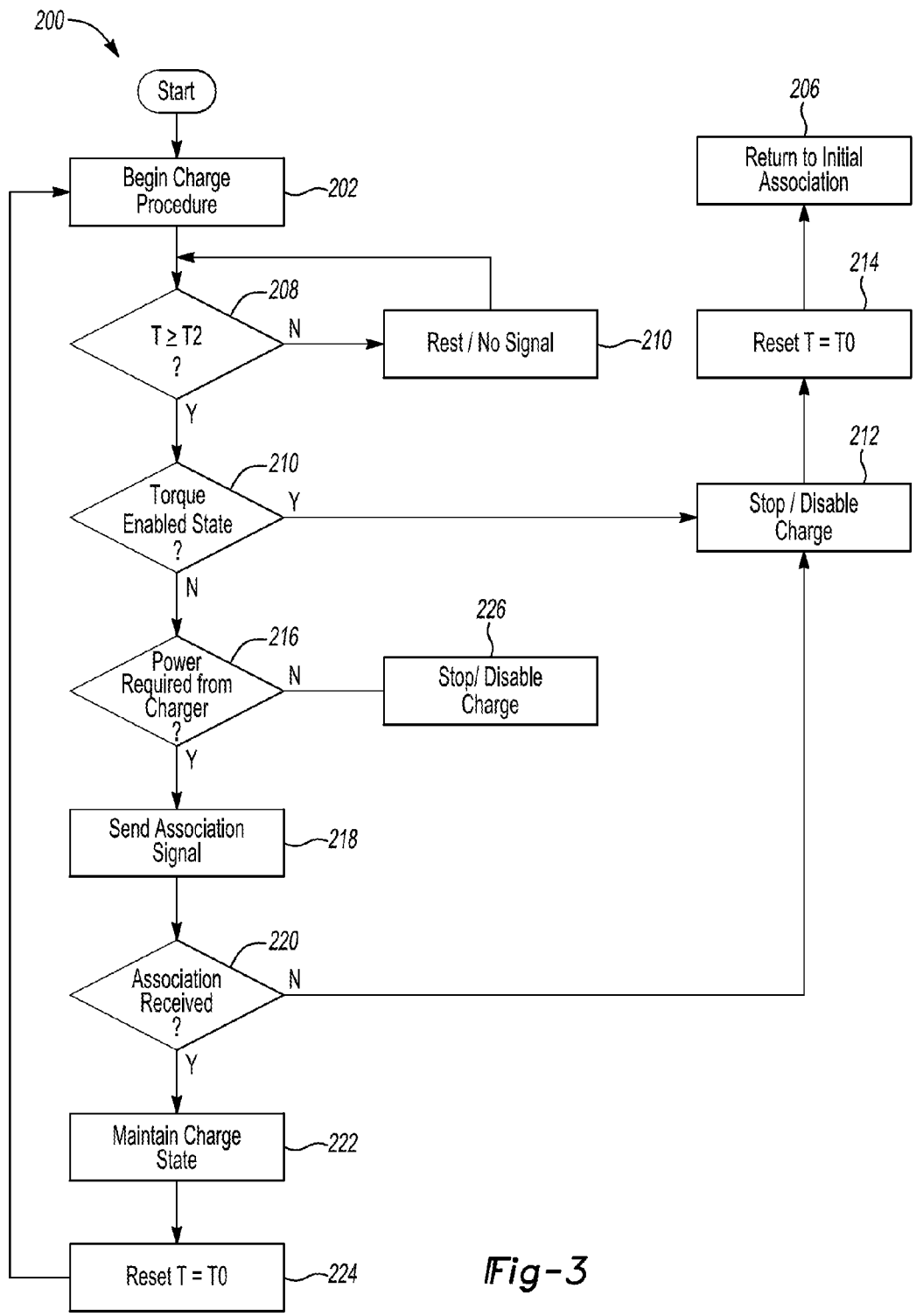
FIG. 3 is a flow chart of an algorithm for conducting thermal regulation during vehicle induction charging.

A method depicting an algorithm of an ongoing association procedure is illustrated in FIG. 3 generally as method 200. The vehicle controller begins a charge procedure in step 202, for example after an initial association between the vehicle and the vehicle charger has been achieved. The vehicle controller then determines in step 208 whether the designated time interval T2 has elapsed between the current time and the initial time reference T0. If not, the controller remains in a rest state in step 210 and provides no command signal to the charger pertaining to vehicle charging. The controller then returns to step 208 to re-consider the current time elapsed from the time reference T0 relative to the designated time interval T2. It should be appreciated that the time interval T2 can be short enough to approximate a continuous association between the vehicle and the charger.

Once the designated time interval T2 has elapsed, the vehicle controller determines in step 210 whether the vehicle is in a torque enabled state. If the vehicle is torque enabled, the vehicle controller provides in step 212 a signal indicative of a command to stop or disable the vehicle charger. The controller would then reset the timer in step 214 to the time reference T0, and subsequently return in step 206 to an initial association procedure.

If the vehicle is not torque enabled, for example in a parked state in step 210, the vehicle controller then determines in step 216 whether the vehicle requires power from the charger. If the vehicle battery charge level exceeds a designated threshold, and if there is no need to power other vehicle activities while docked at the charging station, the vehicle controller provides in step 226 a signal indicative of a command to disable or the vehicle charger. It should be appreciated that the threshold charge level of the ongoing association procedure may or may not be the same level as a battery threshold required to initially begin a charge procedure.

If either the battery charge level is less than the designated threshold charge level, or if the vehicle requires power from the charger to facilitate vehicle activities in step 216, the vehicle controller causes in step 218 an association signal to be transmitted to the vehicle charger. The association signal transmitted in step 218 reaffirms any prior association, and maintains a given charge procedure. If the signal is not received by the vehicle charger in step 220, either the vehicle controller or the charger controller can be configured to discontinue charging in step 212 since the time interval T2 has elapsed and no signal affirming association has been received. The controller(s) would then reset the timer in step 214 to the time reference T0, and subsequently return in step 206 to an initial association procedure.

Once the vehicle charger receives the association signal in step 220, continuance of the charge procedure is enabled and the charge state is maintained in step 222. The controller(s) then resets the timer in step 224, and return to step 202. Depending on the duration of T2, the association signal can be considered to be transmitted either periodically or continuously as the vehicle controller cycles through method 200.

Figure 4:
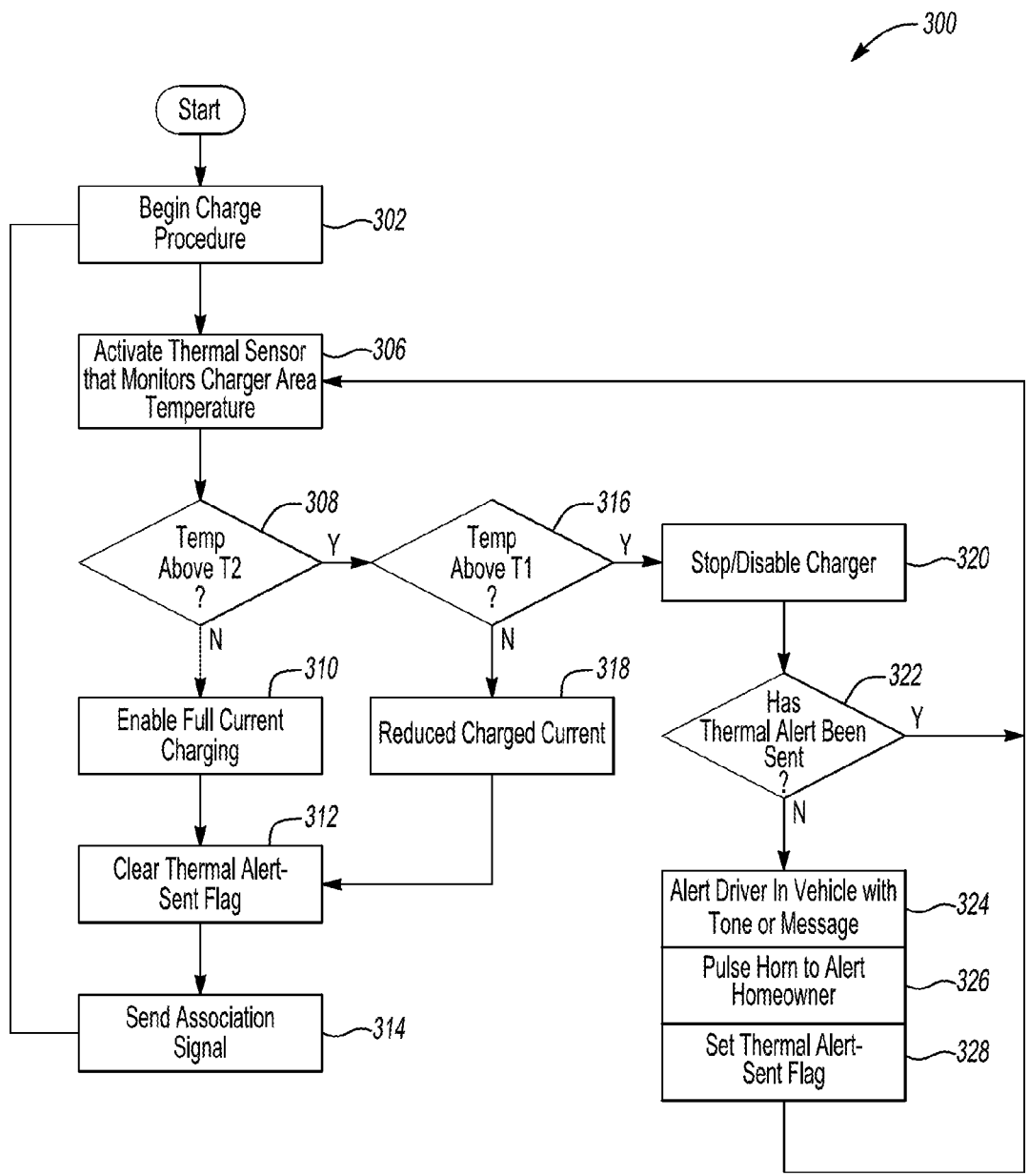
FIG. 4 is a plot representing charge current reduction strategies related to sensed temperature.

According to FIG. 4, an algorithm for managing battery charging while incorporating temperature sensing is depicted generally by method 300. The vehicle controller begins a charge procedure in step 302. An association request and affirmative response as discussed above can also be required to enable selection of a charge state. The vehicle controller causes the activation of the thermal sensors in step 306 to monitor temperature in the area near the induction charging plates. Once active, the thermal sensors output signals indicative of the sensed temperature to the vehicle controller. In step 308, the vehicle controller uses data received from thermal sensors to determine whether the sensed temperature has exceeded the predefined secondary threshold. If the secondary threshold has not been exceeded in step 308, full current charging is enabled in step 310. The vehicle controller then clears in step 312, any alert-sent flags which are stored in memory related to a prior thermal excursion event. Once full charging is enabled and alerts cleared, the controller causes in step 314, the transmission of the repeated association signal to the charger in order to maintain the prior association. The controller then returns to step 302.

If the sensed temperature has exceeded the secondary threshold in step 308, the vehicle controller considers in step 316 whether the sensed temperature has exceeded the primary threshold. If the temperature has not exceeded the primary threshold in step 316, the vehicle controller causes in step 318, the transmission of a reduction signal prompting the vehicle charger to enter a reduced current charge state. As discussed above, the reduced charge current can be set to a predetermined value, or can also be a functional derived from the value of the sensed temperature. The vehicle controller then clears in step 312, any alert-sent flags which are stored in memory related to a prior thermal excursion event. Once reduced current charging is enabled and alerts cleared, the controller causes in step 314, the transmission of the repeated association signal to the charger in order to maintain the prior association. The controller then returns to steps 302 and 306 to resume thermal sensing.

If the sensed temperature has exceeded the primary threshold in step 316, the vehicle controller causes in step 320, the charger to be disabled from providing power. If a battery charge procedure is already underway, step 320 includes interrupting the procedure in response to an object detection signal. As discussed above, the interruption of the battery charge procedure can be achieved by either an affirmative termination command, by a suspension of the transmission of the repeated association signal, or by a combination thereof. The suspension of the repeated transmission of the association signal causes the vehicle and the charger to lose association, and charging of the battery to discontinue. If a charge procedure has not yet begun, step 320 includes providing a signal indicative of a command to prevent charge initiation.

In step 322, the vehicle controller determines whether a prior thermal alert has been sent to a vehicle operator indicating a thermal excursion, and the disablement of vehicle charging. A prior alert is indicated by a thermal alert-sent flag stored within the memory of the controller. If a prior thermal alert has been sent, the controller returns to step 306 and reactivates the thermal sensors to detect the temperature in the area near the charge field. However, if no prior alert has been sent at step 322, an alert is generated in response to the sensed temperature in steps 324 and 326. The alert can be audible, as shown in step 326, in the form of a vehicle horn pulse. The external horn pulse can have a distinct duration and/or repetition so as to notify an operator that is away from the vehicle. The alert may also include a text message sent to an operator's mobile communication device. An in-vehicle alert is provided as shown in step 324 to notify an operator inside the vehicle. Display messages and audible tones notify a driver that a thermal event has been detected. After providing an operator alert, the vehicle controller sets an internal alert-sent flag in step 328 so as to store an indication that notice was provided to the operator. The controller then returns to step 306 and causes activation of the thermal sensors.

In at least one embodiment, the vehicle is provided with an articulable cover 21 to protect the sensors. Sensors positioned of the on the underside of a vehicle are more susceptible to debris and fouling accumulating upon the lenses of the sensors. This accumulation affects the accuracy of sensor readings, and at a certain point may lead to inoperability. Sensors in this position are paired with an articulable cover 21 to provide protection from debris when in non-charging modes, for example such as active driving. The cover 21 is deployed when the sensors are inactive, and retracts when the sensors are activated, thereby exposing the lens when appropriate for thermal sensing.

In at least one additional embodiment, the vehicle may continue to draw power from the vehicle charger after the attainment of a substantially full battery charge. Power can be drawn from the charger as needed in order to facilitate other vehicle activities while docked at the charging station. During or after the time when a full charge is achieved, the vehicle controller can initiate power flow from the charger to thermally cool or heat the battery, or to heat or cool the passenger cabin. Additionally, over longer term storage the vehicle can power up using the vehicle charger as a power source to check vehicle conditions and perform other diagnostic routines.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery;
   a charge plate electrically connected to the battery;
   a sensor configured to output a signal indicative of a sensed temperature; and
   a vehicle controller configured to cause (a) an association signal to be repeatedly transmitted from the vehicle during a battery charge procedure such that charging of the battery via the charge plate is maintained, and (b) in response to the sensed temperature exceeding a primary threshold, the repeated transmission of the association signal from the vehicle to be interrupted such that charging of the battery ceases.

2. The vehicle of claim 1, wherein the sensor is positioned to sense temperature in an area proximate to the charge plate.

3. The vehicle of claim 1, wherein the at least one controller is further configured to cause, in response to the sensed temperature being greater than a secondary threshold and less than the primary threshold, a reduction signal to be transmitted such that the battery is charged via the charge plate with a reduced charging current.

4. The vehicle of claim 3, wherein the reduced charging current has an amperage level that is a function of a degree of the sensed temperature.

5. The vehicle of claim 3 further comprising an alert mechanism in communication with the controller and configured to generate an alert in response to the sensed temperature exceeding the secondary threshold.

6. The vehicle of claim 1, wherein the at least one controller is further configured to cause, in response to the sensed temperature exceeding the primary threshold, a termination signal to be transmitted such that charging of the battery via the charge plate ceases.

7. The vehicle of claim 1 further comprising a cover configured to shield the sensor when the sensor is inactive and retract thereby exposing the sensor when the sensor is active.

8. The vehicle of claim 1, wherein at least one controller is further configured to cause the association signal to be repeatedly transmitted at predetermined time intervals during a charge procedure.

9. The vehicle of claim 1, wherein at least one controller is further configured to activate the sensor prior to causing the repeated transmission of the association signal.

10. The vehicle of claim 1 further comprising an alert mechanism in communication with the controller and configured to generate an alert in response to the sensed temperature exceeding the primary threshold.

11. A vehicle comprising:
    a battery;
    an inductive charge plate in electrical communication with the battery;
    a sensor configured to output a signal indicative of an external temperature in a vicinity of the charge plate; and
    at least one controller configured to cause (a) an association signal to be repeatedly transmitted to a charge system during a charging of the battery via the charge plate such that charging of the battery is maintained, and (b) in response to the external temperature in the vicinity of the charge plate exceeding a primary threshold, the repeated transmission of the association signal to be suspended such that charging of the battery discontinues.

12. The vehicle of claim 11, wherein the at least one controller is further configured to cause, in response to the temperature being greater than a secondary threshold and less than the primary threshold, a reduction signal to be transmitted such that the battery is charged via the charge plate at a reduced charging current.

13. The vehicle of claim 12, wherein the reduced charging current comprises an amperage level that is based upon a degree of the temperature.

14. The vehicle of claim 12, wherein the at least one controller is further configured to cause, in response to the temperature exceeding the primary threshold, a termination signal to be transmitted to the charging system such that charging of the battery via the charge plate ceases.

15. A method comprising:
    outputting a temperature signal indicative of an external temperature proximate to an inductive charge plate;
    repeatedly transmitting an association signal to a charge system during charging of a battery via the charge plate such that the charge system continues to charge the battery; and
    interrupting the repeated transmission of the association signal in response to the temperature exceeding a primary threshold such that the charge system discontinues charging of the battery.

16. The method of claim 15 further comprising reducing a charge current associated with the charging of the battery in response to the temperature being greater than a secondary threshold and less than the primary threshold such that the charge system charges the battery via the charge plate at a reduced amperage.

* * * * *